United States Patent [19]

Stokes

[11] Patent Number: 4,683,393

[45] Date of Patent: Jul. 28, 1987

[54] REINFORCED ROTOR ASSEMBLY AND METHOD OF MAKING SAME

[75] Inventor: Vijay K. Stokes, Schenectady, N.Y.

[73] Assignee: General Electric Company, Schenectady, N.Y.

[21] Appl. No.: 866,527

[22] Filed: May 23, 1986

[51] Int. Cl.$^4$ .................... H02K 15/02; H02K 21/16
[52] U.S. Cl. .................................... 310/156; 29/598; 310/42; 310/259
[58] Field of Search ................. 310/42, 156, 261, 262, 310/265, 46, 254, 259; 29/598

[56] References Cited

U.S. PATENT DOCUMENTS

| | | | |
|---|---|---|---|
| 3,914,629 | 10/1975 | Gardiner | 310/46 |
| 4,329,606 | 5/1982 | Montagu | 310/156 |
| 4,591,749 | 5/1986 | Gauthier et al. | 310/156 |
| 4,594,525 | 6/1986 | Stokes | 310/156 |
| 4,625,392 | 12/1986 | Stokes | 29/598 |

FOREIGN PATENT DOCUMENTS 589259 11/1933 Fed. Rep. of Germany ...... 310/156

*Primary Examiner*—Patrick R. Salce
*Assistant Examiner*—D. L. Rebsch
*Attorney, Agent, or Firm*—William H. Steinberg; James C. Davis, Jr.; Paul R. Webb, II

[57] ABSTRACT

A rotor assembly particularly suited for use in oscillating electric motors includes magnet assemblies mounted on stiffening rings. The stiffening rings and magnet assemblies are bonded together by an intermediately disposed matrix. Each stiffening ring includes at least two radially outwardly extending tangs, the tangs separating adjacent pairs of magnet assemblies. In operation, these tangs function to support the magnet assemblies, particularly against cyclic fatigue loads developed in oscillating electric motors.

11 Claims, 6 Drawing Figures

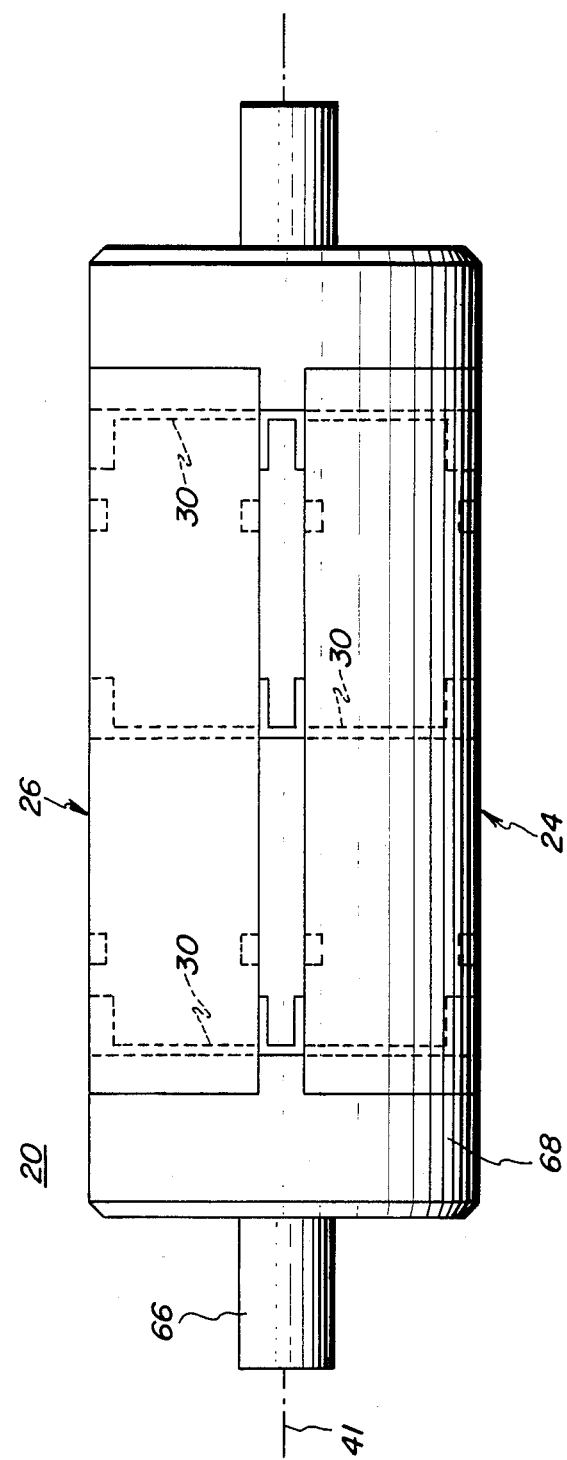

4,683,393

REINFORCED ROTOR ASSEMBLY AND METHOD OF MAKING SAME

RELATED APPLICATIONS

This application is related to copending application Ser. No. 772,819, now U.S. Pat. No. 4,625,392, inventor V. K. Stokes, assigned to the assignee of the present invention and incorporated herein by reference.

BACKGROUND OF THE INVENTION

This invention relates generally to electric motors and more particularly to a rotor assembly and method of making the same.

In many applications employing electric motors, particularly electronically commutated motors, it is desirable to periodically change the direction of rotation of a rotor assembly in the motor to oscillate a driven apparatus. Such applications include, for example, washing machines wherein such oscillating electric motors are used to drive an agitator. When such oscillating electric motors are used, they negate the need for complex and expensive transmissions otherwise required to convert a rotating motion into an oscillating motion.

A problem encountered in the use of oscillating electric motors is that of the oscillatory torque establishing a fatigue load in the rotor assembly. This fatigue load is established at an interface between a flux ring and a magnetic body disposed thereon. Inertial effects associated with this fatigue load cause the development of a cyclic shear stress field, i.e. a shear stress field which reverses direction in each cycle of rotor oscillation, in a direction circumferential to the flux ring. This cyclic shear stress field eventually causes loosening and dislodgement of the magnetic bodies from the flux ring.

It would thus be desirable to provide a rotor assembly which is not subject to the ill effects caused by the cyclic shear stress field. It would be further desirable if such a rotor assembly could be economically fabricated using conventional technologies.

OBJECTS OF THE INVENTION

A principal object of the present invention is to provide a new and improved rotor assembly which provides substantial support for magnetic bodies mounted thereon and which is thus particularly adapted for use in an oscillating electric motor.

A further object of the present invention is to provide a new and improved method for manufacturing a rotor assembly which is economical to implement using conventionally available technologies.

SUMMARY OF THE INVENTION

A new and improved rotor assembly provides support for magnet assemblies mounted thereon, particularly against stresses associated with oscillating motion. This rotor assembly includes at least one stiffening ring including at least two radially outwardly extending tangs. At least two flux ring segments of magnetic flux conducting material are disposed about the outer circumference of the stiffening ring with at least one of the tangs separating each adjacent pair of the flux ring segments. A magnetic body is mounted on each flux ring segment, each of the magnetic bodies having an arcuate outer surface. The totality of the arcuate magnetic body outer surfaces together form a substantially cylindrical rotor surface generally coaxial with the stiffening ring. Mounting means are disposed generally coaxially with the stiffening ring and rotor surface for providing an axis of rotation for the rotor assembly. A matrix is disposed between the stiffening ring, flux ring segments and mounting means for holding these components in their relative positions.

In a preferred embodiment of the invention, two of the stiffening rings are used, the rings being generally coaxially disposed with the tangs in opposing alignment. The flux ring segments are positioned to bridge the outer circumferences of the stiffening rings such that at least two of the opposing tangs separate each adjacent pair of flux ring segments.

A preferred method of manufacturing the rotor assembly described above is implemented by first providing a stiffening ring, flux ring segments, and magnetic bodies of the type described above. The magnetic bodies are mounted on the flux ring segments, and the flux ring segments are mounted across the outer circumference of the stiffening ring such that one of the tangs is disposed between each adjacent pair of the flux ring segments and such that the outer surfaces of the magnetic bodies form a generally cylindrical rotor surface. A matrix is then disposed between the stiffening ring and flux ring segments for holding these components in their relative positions.

In a preferred embodiment of the method, two stiffening rings are provided and disposed substantially coaxially and with their tangs in opposing alignment. The flux ring segments are mounted in bridging relationship across the outer circumferences of the stiffening rings such that a pair of opposing tangs are disposed between each adjacent pair of said stiffening rings.

BRIEF DESCRIPTION OF THE FIGURES

While the specification concludes with claims defining the features of the invention that are regarded as novel, it is believed that the invention, together with further objects thereof, will be better understood from a consideration of the following description in conjunction with the drawing figures, in which:

FIGS. 5 and 6 illustrate side views of alternate embodiments of the present invention.

DETAILED DESCRIPTION OF THE INVENTION

Figure 1:
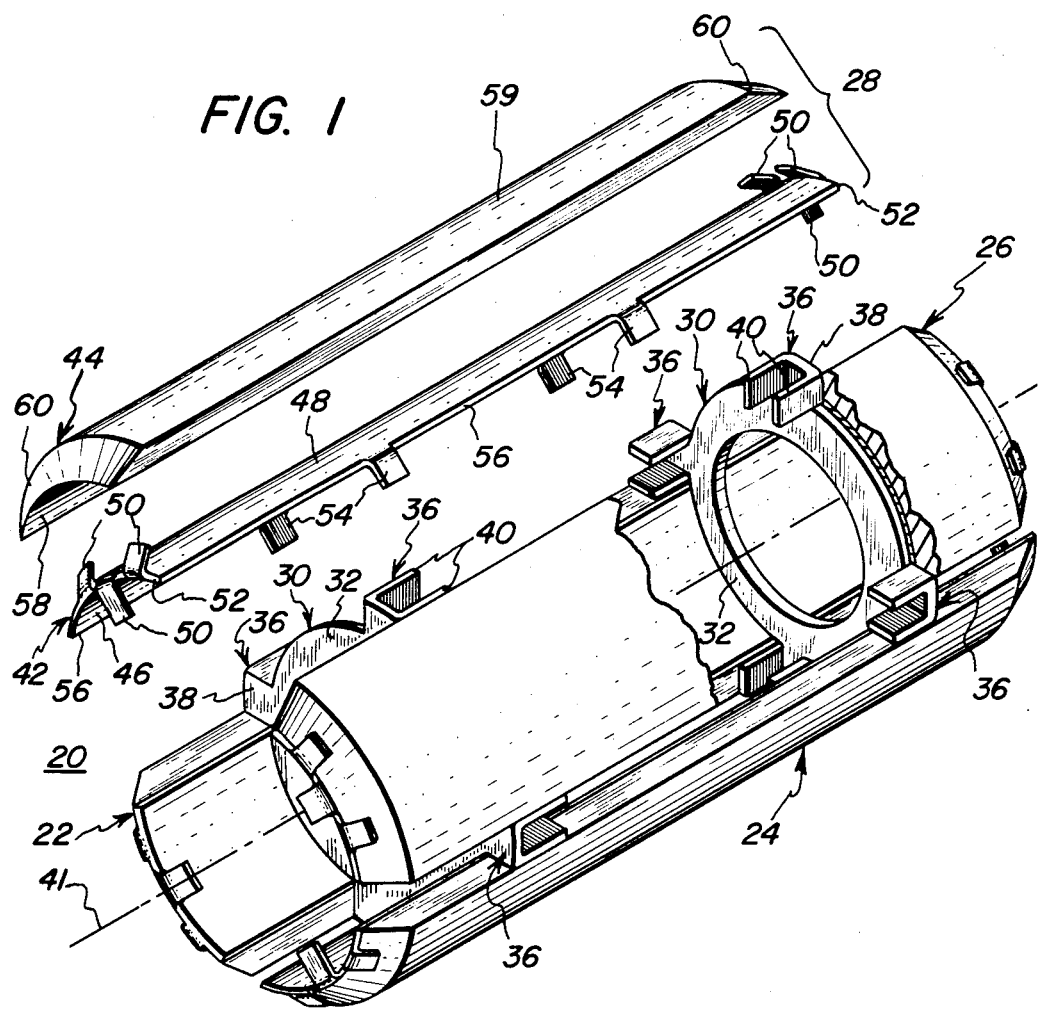
FIG. 1 illustrates a partially exploded and cut-away perspective view of a rotor assembly constructed in accordance with the invention.
Figure 2:
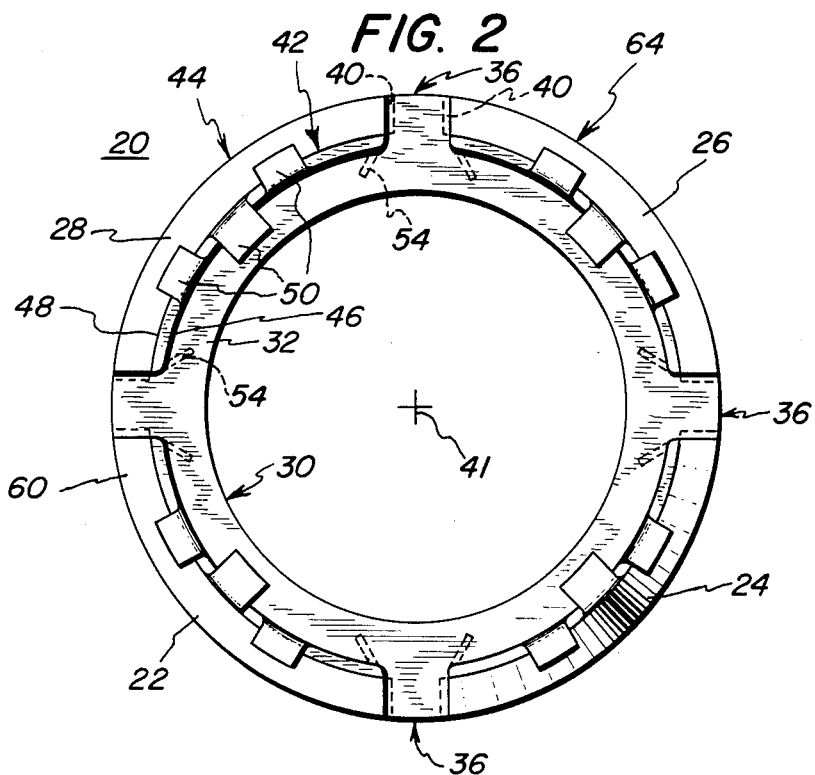
FIG. 2 illustrates an end view of the rotor assembly of FIG. 1 in assembled form.

Referring now to FIGS. 1 and 2, a rotor assembly 20 is shown including four magnet assemblies 22, 24, 26, 28. Magnet assemblies 22, 24, and 26 are shown mounted in bridging relationship across a pair of stiffening rings 30, while magnet assembly 28 is shown exploded therefrom for purposes of illustrating details. Each ring 30 comprises a hollow, annular body portion 32, with four regularly spaced tangs 36 extending radially outwardly thereof. Each tang 36 is generally U-shaped including a base 38 and a pair of legs 40. Rings 30 are disposed coaxially with one another about an axis 41, and with tangs 36 in opposing alignment. Stiffening rings 30 comprise a material characterized by a high rigidity, preferably a metal such as steel.

Each magnet assembly 22, 24, 26, 28 comprises a flux ring segment 42 and a body 44 of permanent magnet material mounted thereon. Each flux ring segment 42 comprises a generally arcuately shaped piece of magnetic flux conducting sheet material, preferably a metal such as iron, having a concave surface 46 shaped for mounting on body portion 32 of stiffening ring 30, and a generally convex surface 48 for receiving magnetic body 44. Each flux ring segment 42 further includes three bendable tabs 50 adjoining each transverse end 52 thereof, and two bendable tabs 54 adjoining each longitudinal edge 56 thereof. Each magnetic body 44 is generally arcuate, and includes an inner concave surface 58 for mounting on flux ring segment 42 and an outer convex surface 59 chamfered at its longitudinal edges 60. Magnetic bodies 44 comprise a permanent magnet material, for example a ferrite ceramic material.

Each magnetic body 44 is sized to fit in registry on its corresponding flux ring segment 42, the resulting magnet assemblies 22, 24, 26 and 28 being sized to fit snugly between pairs of opposing tangs 36 such that one opposing pair of the tangs separates each adjacent pair of magnet assemblies 22, 24, 26, 28. Each magnet assembly 22, 24, 26, 28 is thusly disposed in bridging relationship between body portions 32 of rings 30, with the edges 40 of each tang disposed adjoining the separated magnet assemblies. The central tab of each three tabs 50 is bent radially inward, while the bracketing two tabs are bent to engage the overlying magnetic body 44. Magnetic bodies 44 are thus fastened to flux ring segments using tabs 50 and/or an intermediately disposed adhesive. The convex outer surfaces 59 of magnetic bodies 44 form a generally cylindrical rotor surface 64 (FIG. 2) at which tangs 36 terminate.

Figure 3:
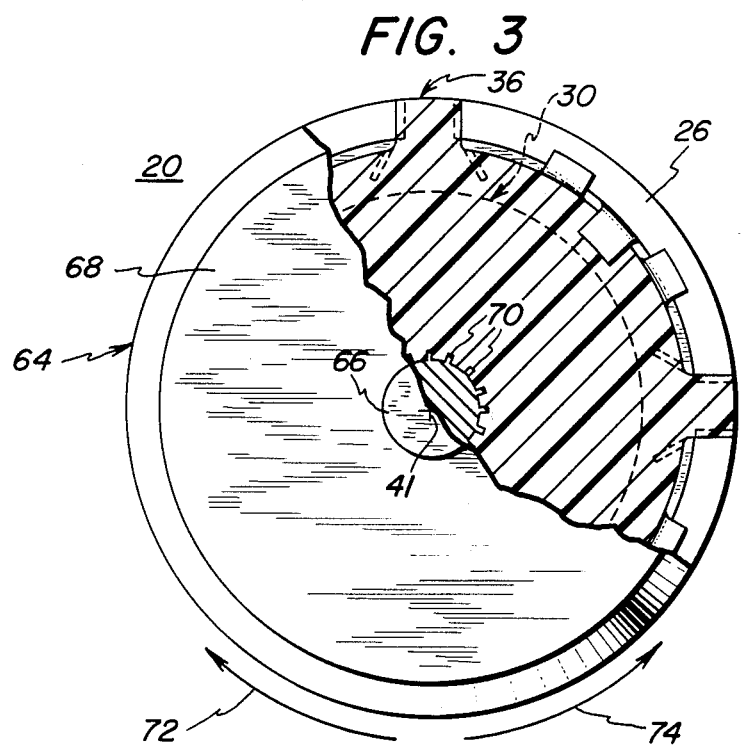
FIG. 3 illustrates a partially sectioned end view of the rotor assembly of FIG. 2 mounted on a shaft.
Figure 4:
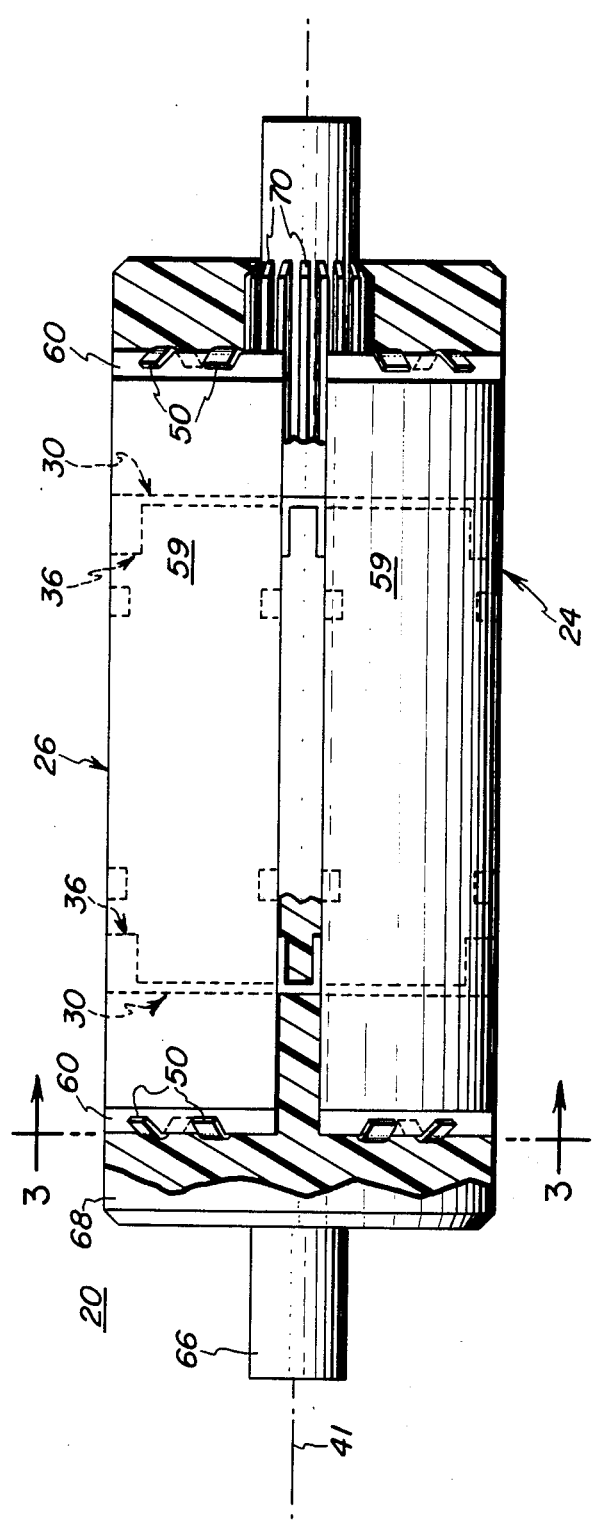
FIG. 4 illustrates a partially sectioned side view of the rotor assembly of FIG. 3.

FIGS. 3 and 4 show rotor assembly 20 assembled and further including a shaft 66 disposed coaxially with stiffening rings 30, and a matrix 68 molded between the stiffening rings, the shaft, flux ring segments 42, magnetic bodies 44 and over chamfered edges 60 of each magnetic body outer surface 59. Each FIG. 3 and 4 is partially cut-away to better illustrate structural details. Tangs 36 space magnet assemblies 22, 24, 26, 28, thus permitting matrix 68 to extend to surface 64 of rotor assembly 20. Radially inwardly extending bendable tabs 50 and 54 engage matrix 68 for helping secure magnet assemblies 22, 24, 26, 28 to the matrix. Shaft 66 functions to provide an axis of rotation for rotor assembly 20, and preferably comprises a metal such as steel. Shaft 66 optionally includes splines 70 for better engaging matrix 68. Matrix 68 preferably comprises a light weight, easy to mold material such as a plastic, for example phenolic.

In operation, when rotor assembly 20 is employed in an electric motor (not shown) and rotated about the axis of shaft 66, stiffening rings 30 with tangs 36 serve to support magnet assemblies 22, 24, 26 and 28 against rotational stresses. Rotor assembly 20 is particularly suited for use in oscillating, electronically commutated electric motors (not shown) wherein the rotor assembly is alternately rotated in opposite directions about shaft 66 (i.e. in directions 72 and 74 in FIG. 3). When rotor assembly 20 is used in such oscillating electric motors, stiffening rings 30 and particularly tangs 36 function to counteract a cyclic shear stress field in the circumferential direction which would otherwise loosen and dislodge magnet assemblies 22, 24, 26 and 28 from rotor assembly 20.

It will be understood that shaft 66 functions to provide an axis of rotation for rotor assembly 20, and could be replaced by similarly functioning structure such as a spider type hub or a bearing assembly. While tangs 36 have been shown and described as U-shaped, it will be appreciated that this shape is convenient for spacing magnet assemblies 22 and permitting matrix 68 to be introduced therebetween. Tangs 36 are not limited to this U-shape, and could, for example, comprise simple rectangular tabs or other structure suitable for providing the required support to magnet assemblies 22. While matrix 68 is shown to overlap chamfered edges 60 of magnet assemblies 22, 24, 26, 28, this placement of the matrix is optional to increase the strength with which the magnet assemblies are bonded to rotor assembly 20. It will be understood that matrix 68 need not comprise a solid body, but only need be sufficient to maintain the relative positions between the various elements. Similarly, some or all of tabs 50 and 54 may be omitted, or more tabs added, depending on the desired strength of the resulting rotor assembly 20.

Figure 5:
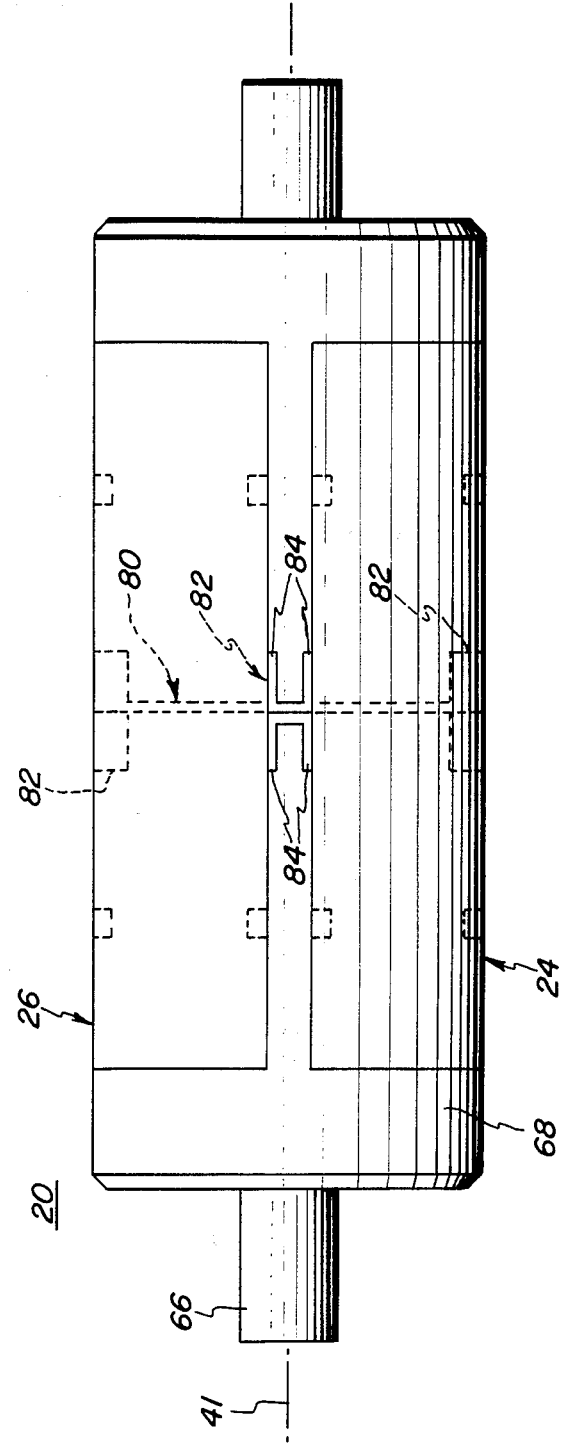

FIGS. 5 and 6 show alternate embodiments of rotor assembly 20 wherein elements identical to those of FIGS. 1-3 are indicated by like reference numerals. FIG. 5 shows a rotor assembly 20 wherein magnet assemblies 22, 24, 26 and 28 are disposed on a single, substantially centrally disposed stiffening ring 80. In the embodiment of FIG. 5, stiffening ring 80 preferably includes tangs 82 having U-shaped prongs 84 extending in opposite directions, two of the tangs, for example, being soldered onto stiffening ring 80. The embodiment of FIG. 6 shows three stiffening rings 30, identical to those shown and described in FIGS. 1-3 above, spaced at regular intervals along the axial length of rotor assembly 20. It will be appreciated that the number of stiffening rings utilized in a rotor assembly 20 may be varied depending on the length of the rotor assembly.

One method of manufacturing the flux ring assemblies described in FIGS. 1-6 above is performed by first providing at least one stiffening ring, and at least two flux ring segments and magnetic bodies of the type described hereinabove. The magnetic bodies are mounted on the flux ring segments using the bendable tabs and/or an adhesive. The flux ring segments are then mounted across the outer circumference of the flux ring such that the outer surfaces of the magnetic bodies form a cylindrical rotor surface and such that at least one of the tangs separate each adjacent pair of flux ring segments. The matrix is then molded between the stiffening rings, the flux ring segments, the magnetic bodies, and optionally over the chamfered edges of the magnetic bodies. Such molding could be performed, for example using a cylindrical mold of the type shown in U.S. Pat. Ser. No. 4,625,392, referenced hereinabove.

When multiple stiffening rings are used, the rings are disposed coaxially, with the tangs in opposing alignment. The flux ring segments are mounted bridging the outer circumferences of the rings such that at least one pair of opposing tangs separates each adjacent pair of flux ring segments.

When a shaft is desired to be incorporated in the rotor assembly, an appropriate shaft is disposed through and coaxially with the stiffening rings before the matrix is molded. In this preferred method of manufacturing a rotor assembly, the flux ring segments and stiffening rings are preferably stamped from sheet metal. The stiffening rings comprise for example steel, and the flux ring segments comprise for example iron.

The above described method of manufacturing a rotor assembly is economically performed using commercially available technologies. Further, when multiple spaced stiffening rings are used, the rings function to automatically place the outer surfaces of the magnetic bodies on a true cylinder, obviating the need for other, more complicated trueing and aligning steps.

While preferred embodiments of the invention have been illustrated and described, it will be clear that the invention is not so limited. Numerous modifications, changes, variations, substitutions and equivalents will occur to those skilled in the art without departing from the spirit and scope of the present invention. Accordingly, it is intended that the invention herein be limited only by the scope of the appended claims.

What is claimed is:

1. A rotor assembly comprising:
   at least one stiffening ring including at least two radially outwardly extending tangs;
   at least two flux ring segments of magnetic flux conducting material, each of said flux ring segments disposed about the outer circumference of said stiffening ring with at least one tang separating each adjacent pair of said flux ring segments;
   a magnetic body mounted on each of said flux ring segments, each of said magnetic bodies including an arcuate outer surface, said magnetic body outer surfaces forming a substantially cylindrical rotor surface generally coaxial with said stiffening ring;
   mounting means for providing an axis of rotation for said rotor assembly; and
   a matrix disposed between said stiffening ring, said flux ring segments and said mounting means for maintaining the relative positions therebetween.

2. The rotor assembly of claim 1 wherein:
   two of said stiffening rings are disposed generally coaxially and with said tangs in opposing alignment; and
   said flux ring segments are disposed so as to bridge the outer circumferences of said stiffening rings with at least two opposing said tangs separating each adjacent pair of said flux ring segments.

3. The rotor assembly of claim 2 wherein:
   each of said stiffening rings comprises metal;
   said tangs are disposed at regular intervals about the circumference of said stiffening rings and terminate at said rotor surface;
   each of said flux ring segments comprises an arcuate piece of sheet material; and
   each of said magnetic bodies further includes an arcuate inner surface for mounting on said flux ring segments.

4. The rotor assembly of claim 2 wherein said mounting means includes a shaft extending through said stiffening rings and disposed generally coaxially therewith.

5. The rotor assembly of claim 2 wherein each of said flux ring segments includes at least one bendable tab positioned to engage said matrix.

6. The rotor assembly of claim 2 wherein each of said flux ring segments includes at least one bendable tab positioned to engage its respective said magnetic body.

7. The rotor assembly of claim 2 wherein said matrix comprises a plastic.

8. The rotor assembly of claim 2 wherein:
   each of said tangs comprises a generally U-shaped channel having its walls disposed in contact with the adjoining flux ring segments; and
   said matrix is further disposed between each of said magnetic bodies.

9. The rotor assembly of claim 2 wherein:
   said outer surface of each of said magnetic bodies includes at least one chamfered edge; and
   said matrix is further disposed over each of said chamfered edges for bonding said magnetic bodies to said rotor assembly.

10. The rotor assembly of claim 2 wherein said magnetic bodies are adhesively bonded to said flux ring segments.

11. A rotor assembly comprising:
    at least two metal stiffening rings, each of said stiffening rings including at least two radially outwardly extending tangs spaced at regular intervals about the circumference of said stiffening ring, said stiffening rings disposed generally coaxially and with said tangs in opposing alignment;
    at least two flux ring segments of magnetic flux conducting material, each of said flux ring segments comprising an arcuate piece of sheet material, each of said flux ring segments disposed bridging the outer circumferences of said stiffening rings with at least two opposing said tangs separating each adjacent pair of said flux ring segments;
    a magnetic body mounted on each of said flux ring segments, each of said magnetic bodies including an arcuate inner surface adjoining a flux ring segment, each of said magnetic bodies further including an arcuate outer surface, said magnetic body outer surfaces forming a generally cylindrical rotor surface, each of said magnetic bodies further including at least one chamfered edge;
    each of said tangs terminating at said rotor surface;
    a shaft extending through said stiffening rings and disposed generally coaxially therewith;
    a plastic matrix disposed between said stiffening rings, said flux ring segments, said shaft, said magnetic bodies, and over the chamfered edge of each of said magnetic body outer surfaces; and
    each of said flux ring segments including at least one bendable tab positioned to engage said matrix and one bendable tab positioned to engage said magnetic body.

* * * * *